(12) United States Patent
Bahl

(10) Patent No.: US 7,908,660 B2
(45) Date of Patent: Mar. 15, 2011

(54) DYNAMIC RISK MANAGEMENT

(75) Inventor: Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1073 days.

(21) Appl. No.: 11/702,974

(22) Filed: Feb. 6, 2007

(65) Prior Publication Data
US 2008/0189788 A1    Aug. 7, 2008

(51) Int. Cl.
*H04L 29/14* (2006.01)
*H04L 29/12* (2006.01)

(52) U.S. Cl. .......................................................... 726/25

(58) Field of Classification Search .................. 717/118; 713/164, 151, 166–167; 726/25–26, 22
See application file for complete search history.

(56) References Cited

U.S. PATENT DOCUMENTS

| | | | |
|---|---|---|---|
| 5,684,957 A | 11/1997 | Kondo et al. | |
| 5,699,403 A | 12/1997 | Ronnen | |
| 5,812,763 A | 9/1998 | Teng | |
| 5,892,903 A | 4/1999 | Klaus | |
| 6,108,786 A | 8/2000 | Knowlson | |
| 6,298,445 B1 * | 10/2001 | Shostack et al. | 726/25 |
| 6,535,227 B1 | 3/2003 | Fox et al. | |
| 7,155,741 B2 * | 12/2006 | Sobel et al. | 726/22 |
| 7,159,210 B2 * | 1/2007 | Griffin et al. | 717/141 |
| 7,287,280 B2 * | 10/2007 | Young | 726/25 |
| 2004/0193912 A1 | 9/2004 | Li et al. | |
| 2006/0101517 A1 * | 5/2006 | Banzhof et al. | 726/25 |
| 2006/0136986 A1 | 6/2006 | Doolittle | |
| 2006/0191007 A1 | 8/2006 | Thielamay | |
| 2006/0259967 A1 | 11/2006 | Thomas et al. | |
| 2007/0067845 A1 * | 3/2007 | Wiemer et al. | 726/25 |

FOREIGN PATENT DOCUMENTS
WO    WO2005079037 A1    8/2005

OTHER PUBLICATIONS

Blaze, et al., "The Role of Trust Management in Distributed Systems Security", http://www.cse.buffalo.edu/~hungngo/classes/2005/620/reading-materials/BFIK-SIP.pdf.
Ganger, et al., "Enabling Dynamic Security Management of via Device-Embedded Security", Date: Dec. 2000, http://www.pdl.cmu.edu/PDL-FTP/Storage/CMU-CS-00-174.pdf.
Teo, et al., "Dynamic and RiskAware Network Access Management", Date: 2003, pp. 217-230, http://delivery.acm.org/10.1145/780000/775441/p217-teo.pdf?key1=775441&key2=9644684611&coll=GUIDE&dl=GUIDE&CFID=7570169&CFTOKEN=4257829.

* cited by examiner

*Primary Examiner* — Minh Dinh
*Assistant Examiner* — Venkat Perungavoor
(74) *Attorney, Agent, or Firm* — L. Alan Collins; Collins & Collins Incorporated

(57) ABSTRACT

A dynamic risk management system for operating systems that provides monitoring, detection, assessment, and follow-up action to reduce the risk whenever it rises. The system enables an operating system to protect itself automatically in dynamic environments. The risk management system monitors a diverse set of attributes of the system which determines the security state of the system and is indicative of the risk the system is under. Based on a specification of risk levels for the various attributes and for their combinations, the risk management system determines whether one or more actions are required to alleviate the overall risk to the system.

18 Claims, 11 Drawing Sheets

DYNAMIC RISK MANAGEMENT

BACKGROUND

Risk management involves the measuring and/or assessing of risk and the development of strategies to manage that risk. In a computer system, risk management involves preventing and addressing malicious attacks as well as adversarial actions taken unknowingly that may corrupt normal operations. Known technologies for risk management of computer systems are described as follows.

Network Access Protection (NAP) determines machine (operating system) health (that is, whether the machine meets specified security requirements) prior to admitting it on a network. The determination may be performed after various events, including: at connect, authentication or re-authentication, during IP configuration of the machine, and/or when there is a change to the software state of the machine such as when an update is applied. For example, in the case of Dynamic Host Configuration Protocol (DHCP), NAP processing may occur at IP configuration times, including renewal or reconfiguration. In the case of 802.1x, NAP processing may occur at authorization and reauthorization times. In the NAP model, a NAP agent on the machine checks the health of a machine, captures its findings in a statement of health or bill of health (SOH/BOH), and sends the same to a NAP server or end station, respectively. If the NAP server or end station determines the machine to be unhealthy, it is put on a restricted network or the connection is not allowed until the machine gets patched appropriately.

Microsoft Baseline Security Analyzer (MBSA) is a tool designed for IT professionals that helps small and medium-sized businesses determine their security state in accordance with Microsoft security recommendations. MBSA provides Host Vulnerability Assessment (HVA). HVA may be used for checking vulnerabilities in the machine and generating a report for an administrator's benefit. The administrator may analyze the reported vulnerabilities in the machine to determine the risk the machine and the network is under. The administrator may then take appropriate actions to mitigate or fix the vulnerabilities in order to reduce the risk. Alternatively, such action may be taken automatically in accordance with security policy on the machine.

Other technologies, including anti-malware and intrusion detection/prevention technologies, guard against infiltration attempts by malware and may check for the presence of malware on the machine. When malware is discovered, these technologies may take preventative action of blocking, quarantining, or cleaning the malware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some embodiments of the system described herein control dynamic risk management of an operating system in which a security state of the operating system may be automatically assessed independent of security state changes. A risk level may be determined according to the security state. An action related to the operating system may be caused to be performed based on the risk level.

Some embodiments of the system described herein control dynamic risk management of an operating system in which a security state of the operating system is assessed and a tiered set of actions related to the security state is automatically caused to be performed. The tiered set of actions may include (i) determining a risk level based on at least one risk factor of the security state and (ii) causing a risk alleviation action related to the operating system to be performed based on the risk level.

DETAILED DESCRIPTION

Described herein are various technologies and techniques for dynamic risk management. Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments described herein may be implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein may be referred to alternatively as operations, steps or modules.

The system described herein may be used in conjunction with any suitable computer operating system or version thereof. For example, the system described herein may be used with Microsoft Windows®, Linux®, Mac OS X® and/or other operating system.

Figure 1:
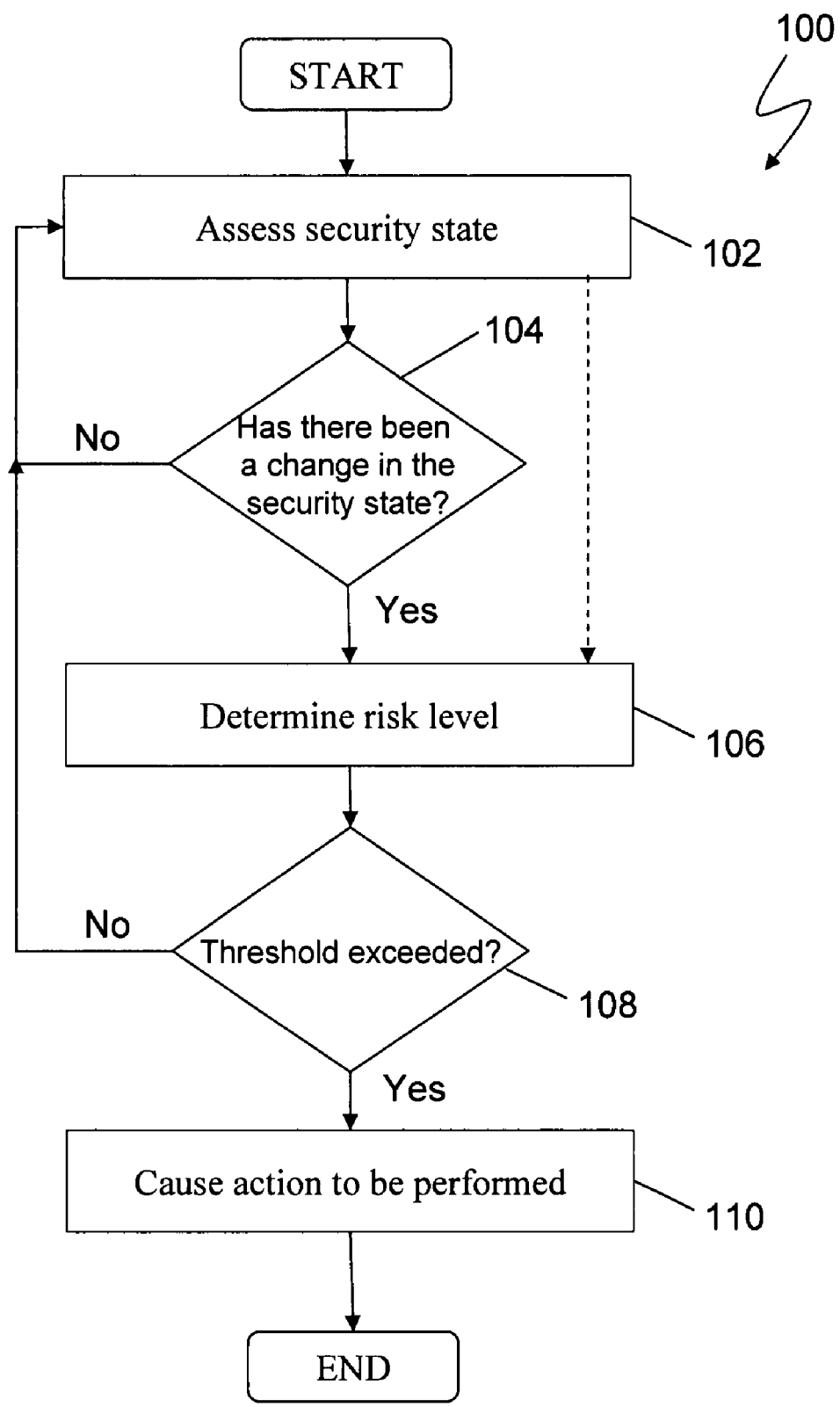
FIG. 1 is a flow diagram illustrating dynamic risk management of an operating system according to an embodiment of the system described herein.

FIG. 1 is a flow diagram 100 illustrating dynamic risk management of an operating system according to an embodiment of the system described herein. Processing begins at a step 102 at which a security state of the operating system is assessed. Assessment of the security state may be initiated by a user or may be initiated after occurrence of an event, such as at connect, after authentication or re-authentication, during IP configuration of the machine, and/or when there is a change to the software state of the machine such as when an update is applied, as further described elsewhere herein. Alternatively, the assessment may occur automatically after a certain time interval, as further described elsewhere herein.

The assessment of the operating system identified by the step 102 may include monitoring system components. Example system components include specific (or all) registry keys, active processes, specific (or all) folders and files, certain types of network traffic, status of security services, system, application, and audit log entries, and specific performance counters, among others. Other appropriate components or combinations of components may be monitored. The system components may be monitored using push and pull mechanisms. In a push model, components may publish data about their security state and the system may subscribe to the information. In a pull model, the system may actively query the components for data abut their security state. The assessment is used to identify risk factors (attributes or pulse points) of the system that are used to determine the risk level, as further described elsewhere herein. The risk factors monitored may cover operational parameters, CPU and bandwidth (BW) usage, Checksum/IP Security (IPSEC) errors, memory and page faults, etc. In an embodiment, a Risk Manager (RM) may monitor the risk factors and perform other actions as further described elsewhere herein.

Example risk factors include host security profile, network type, network security profile, user risk profile, software risk profile, network risk profile, and/or environmental factors, among others, described as follows.

Host security profile—The host security profile may indicate the security framework on the machine, for example whether the machine has Authenticated Firewall, Anti-Malware, and IDS/IPS enabled. The less the machine has in terms of a security framework, the weaker the security profile and the less secure the machine is. As further described elsewhere herein, the determination of the strength of the machine security profile may also take into account vulnerabilities in the machine such as specific attack prone ports being open, missing patches and outdated signature files.

Network type—The network type may indicate the type of network to which the machine is connected, and may be, for example, work (corporate or enterprise), public or private. Work network may be one where a machine is domain joined. Private network may be a non-domain network where the machines on the network may be mostly known and owned by the same person, group or establishment. Public network may be an open network as in public hotspots where machines on the network are mostly unknown machines that may be owned by different persons, groups or establishments. The machine may be generally at a higher risk on a public network as compared to a private network. Likewise, the machine may be at more risk on a private network as compared to a work network because of the lack of IT managed processes and infrastructure on the private network.

Network security profile—The network security profile may provide a more detailed assessment of risk of using a network and complement other risk assessment benchmarks by checking the security profile of the network. The security profile of the network is based on factors such as the media and type of connectivity used and the security configuration of the network. As an example, a network with an Edge Firewall or Proxy Server that enforces all clients to establish encrypted VPNs or check application usage/traffic may offer better security than a network without such an Edge Firewall or Proxy Server. Likewise, a network protected by Network Access Protocol Server (NAP) offers better security than one without NAP. An unsecured Wi-Fi network offers less security than one that requires 802.1x/WPA and a cable connection as against DSL offers less security because, unlike DSL, a cable connection is a shared medium. The strength of the security profile of a network may be specified by a metric that is factored into the evaluation of the risk level of the network.

User risk profile—The user risk profile may indicate the risk profile of the user using the machine and may be a measure of how much the user using the machine can put the machine at risk. The reputation of the user may factor into the determination of the user risk but it may be predominantly determined by user actions and their results. The machine may be configured with the user risk information or may determine the user risk factor itself. As such, the machine may be self-learning and improve the risk assessment over time as the machine processes more history of actions and subsequent results.

Software risk profile—The software risk profile may indicate the risk due to the software running on the machine. The reputation of the software may factor into the risk level determination. As an example, non-certified or unknown software, for example, low assurance software, raises the risk level of the machine. The system may keep account of the negative impact, if any, due to running specific software on the machine and uses that to assign a risk value to the software. For example, if a machine that is supposed to be in a specific role, as specified by a Security Configuration Wizard (SCW), violates that role's boundaries by running software that executes functionality outside of that role, the risk increases.

Network risk profile—The network risk profile may determine the risk level of the network. The network risk level may be determined by assessing vulnerabilities in the network. Unlike the network security profile, the network risk profile may be fairly dynamic. The network risk level may be determined by consideration of the following factors: (i) risk level of individual machines (machines may communicate their risk level to a central controller/system over secured channels; (ii) suspect activity on the network (an example would be significant increase in port or vulnerability scans, which when combined may indicate an increased chance of a follow-up attack); and/or (iii) presence of unmanaged or legacy machines. The network risk level may also be affected by external (environmental) factors such as publishing of vulnerabilities existent in one or more machines on the network and publishing and/or execution of their exploits, as further described elsewhere herein.

In various embodiments, the network risk level may be specified by an administrator or determined dynamically. The network risk level may be determined dynamically from events and risk scores generated by machines and network infrastructure components that are collected and analyzed at a central server such as NAP or a Network Vulnerability Assessment (VA) server. The network risk level may also be determined using a community network. For example, a peer to peer model may be used by a community of machines to share risk information.

Figure 2:
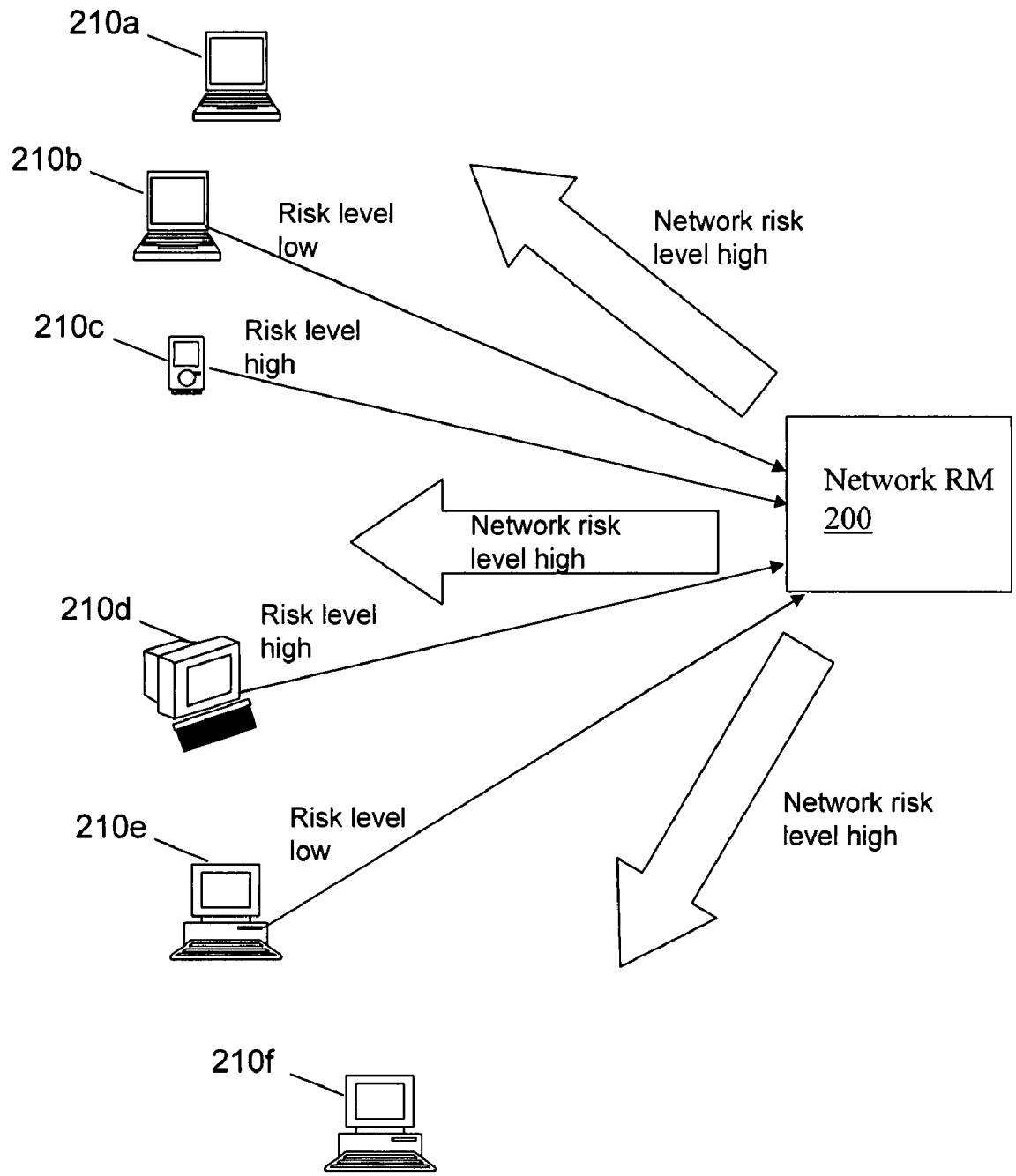
FIG. 2 is a schematic illustration showing operation of a central server communicating a network risk level to machines on or associated with a network according to an embodiment of the system described herein.

FIG. 2 is a schematic illustration showing operation of a central server 200, that includes a Network RM, communicating a network risk level to all machines 210a, 210b, 210c, 210d, 210e, 210f on a network that the central server 200 assessed from data on individual risk levels of the machines 210b-e on the network and/or using administrator input. The central server 200 may optionally also communicate risk alleviation instructions. The network risk level may be communicated to the machines 210a-f on the network through a variety of mechanisms, including sending a network beacon such as a periodic secure message and/or through peer to peer communication. If desired, the frequency of the beacon may be increased for certain time durations to increase the probability of all machines seeing it within a certain period of time. For example, machines that are off network may not receive the beacon unless the beacon is sent, or is continually on, when the machines join the network. Additionally, the network beacon may carry additional information about an action to take. For example, the network beacon may specify "increase the amount of security" which may translate to setting the IE Zone to be "Internet", setting IE security to High, more finely disabling Active Scripting, and/or taking other actions, as further discussed elsewhere herein.

Environmental factors—Environmental factors may be specific events that take place outside of the machine or its network that result in the elevation of a machine's and network's risk level. Environmental factors may affect both machine and network risk levels directly—network risk levels may affect machine risk levels and, therefore, there may be an indirect causal relationship between environmental factors and machine risk level. For example, the risk level of a machine may increase if one or more vulnerabilities on the machine or its network are announced. The machine risk level may increase further if exploit code is published for those vulnerabilities and increase even further if the worm carrying the exploit code exploits one or more machines with the same vulnerability and starts propagating.

Referring again to FIG. 1, after the step 102, processing proceeds to a test step 104 at which it is determined whether a change in the security state has occurred from a previous assessment. If no change in the security state has occurred then processing may proceed back to the step 102. This embodiment may avoid wasting unnecessary CPU processing time if no change in the security state has occurred. If a change in the security state has occurred, processing proceeds to a step 106 at which a risk level is determined. Alternatively, in another embodiment, the test step 104 may be avoided by having processing automatically proceed from the step 102 to the step 106. This embodiment may be advantageous as a security safeguard mechanism in the case where a change in the security state occurred but, for whatever reason, was not detected. The different embodiments may be implemented according to particular requirements of a system.

At the step 106, a risk level of the security state may be determined. To determine the risk level, a risk score may be provided to each assessed risk factor that may be factored into the determination of the risk level. A score may also be provided to the risk increment caused by combinations of risk factors. The risk increment is a measure of the extra risk on top of the aggregate risk of individual risk factors that is reflective of the increased risk from having multiple risk factors existing at the same time. Scores of risk factors may be assigned automatically, such as default values, or may be scores specified by an administrator. An administrator may also specify one or more aggregate risk levels for the machine that, when crossed, triggers follow-up action. The risk score used may be a number, such as from 1 to 5 or 1 to 20, and/or may be a level, such as Low, Moderate, Medium, High and Critical, and/or may be some other risk identifier.

Figure 3:
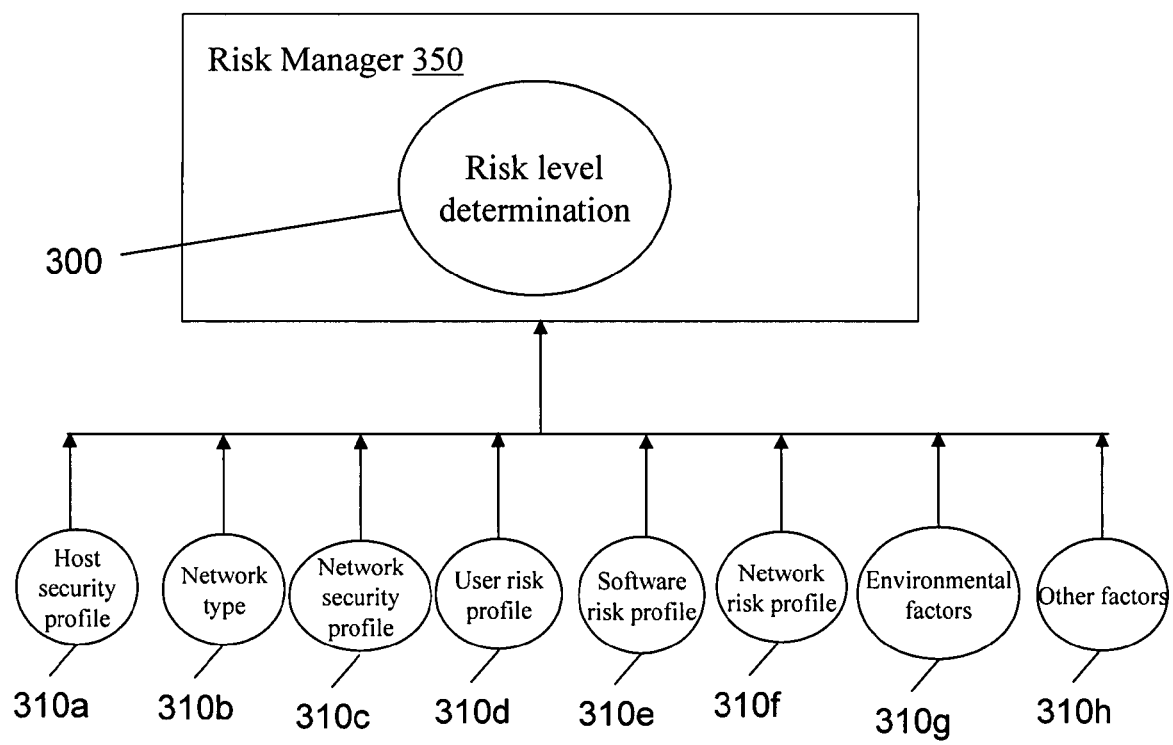
FIG. 3 is a schematic illustration of a controller with a processor for determining a risk level using information received on risk factors according to an embodiment of the system described herein.

FIG. 3 is a schematic illustration of a controller 350 (that includes the Risk Manager, RM) with a processor 300 for determining a risk level using information received on risk factors 310a, 310b, 310c, 310d, 310e, 310f, 310g, 310h, as further described elsewhere herein. In an embodiment, a security administrator may assign the risk scores to the individual risk factors as well as their combinations. Determining combinations with respect to risk and specifying extra risk due thereto provides enhanced flexibility in assessing risk at fine granularity. As an example, the administrator may assign a low risk score to "file and print sharing ports" being open because the administrator considers a low risk to be reflective of the danger of the ports being open on an Enterprise network that is protected by an IT deployed infrastructure of protective gear such as an Edge Firewall and stringent administrative processes and controls. Similarly, the administrator may assign a low risk score to the Network Type being Public because the administrator considers the risk to be low when no other risk factor such as ports being open is present. However, the more risky situation of the ports being open on a public network may be addressed by assigning a risk increment value to the combination which indicates the extra risk that exists when both the above-noted risk factors co-exist, i.e. file and print ports open and the Network Type is public (Internet), as further described elsewhere herein. In an embodiment, the administrator may specify the risk score, and other actions, through either local user interfaces, an MMC, and/or via a pre-established policy specified through Group Policy (GP)/System Management Server (SMS) or a combination thereof.

In an embodiment, to determine the risk level of a machine, the following formula may be used:

Risk level=Sum of the risk score of all individual risk factors+risk increments for combinations of risk factors that exist.

Once the risk level is determined, the occurrence of a security event that may potentially change the risk level of the machine triggers the calculation of the new risk level. The formula for determining the new risk level may then be:

New risk level =

Existing risk level + risk score assigned to the new risk factor, if changed − risk score of the old risk factor, if changed + risk increment of any new combination that is now applicable − risk increment of any old combination that is no longer applicable.

The above formula may provide enhanced performance over a formula that requires risk scores of all risk factors if the number of new/old risk factors pertinent to the security event are a small fraction of the total number of risk factors used for evaluating the overall risk score.

For purposes of explanation, the following provides a simple example of a risk level determination. Suppose the administrator has specified the risk scores of the following risk factors and their combinations, as shown in Table 1 (the first column identifies the risk factor or a combination of risk factors with the value of the risk factor or of the combination shown in parenthesis):

TABLE 1

| Risk factor | Risk score (1-5) (1: lowest, 5: highest) or Risk increment | Comment |
| --- | --- | --- |
| Host security profile (File and Print Port Exception, FPPE, , is ON i.e. File & Print ports are open) | 2 | Risk is low (it is assumed that the machine is on a safe network of Network Type: Work) |
| Network Type (Public) | 2 | Risk is low (it is assumed that all ports are shut to incoming traffic) |
| Network Type (Work) | 1 | Risk is low (it is assumed that the Work network has adequate safeguards) |
| Combination (Host security profile, Network type): (FPPE, Public) | 1 | Extra risk due to combination not covered above |
| Combination (Host security profile, Network Type): (FPPE, Work) | 0 | No extra risk since combination was covered above (risk score of Host security profile of FPPE assumed a Work network) |

Suppose that the current security state of the machine is as follows: File and Print Port Exception (ON); Network Type (Work). Then the current risk level is:

Risk level=risk score of FPPE (2) (assumes Network Type: Work)+risk level of Network Type being Work (1)+risk level of the combination of FPPE and Network Type: Work (0)=3.

If the Network Type changes from Work to Public, then the new risk level is:

New risk level=3 (old risk level)+2 (additional risk score of Network Type: Public)−1

(removed risk score of Network Type: Work; note base FPPE risk score assumed Network Type:

Work)+1 (risk increment of new combination of FPPE existing+Network Type: Public)−0

(risk increment of old combination of FPPE existing+ Network Type: Work)=5

The new risk level of 5 is higher than the sum of the risk score of FPPE existing and Network Type: Public which is 3. Because of this higher risk level, a threshold may be exceeded, as further noted below, and policy prescribed risk alleviation actions may be triggered automatically.

In various embodiments, events that elevate the risk level of a machine may be classified into two categories: (1) events that make a machine more vulnerable to infiltration and/or attack and (2) events that indicate possible infiltration and/or attack. Appropriately addressing events of the first kind may substantially reduce incidents of the second kinds of events.

Further, as further discussed elsewhere herein, multiple thresholds may be established to indicate different severities of risk levels.

The following is a sample list of events that, individually or in certain combinations, may raise the risk level to a level that crosses the safety threshold specified for the system. As discussed elsewhere herein, multiple thresholds may be established to indicate severity levels, for example danger levels and/or critical levels. The events may be detected through monitoring of specific attributes of the system, as further described elsewhere herein.

(1) Joining an unsafe network: A machine may join a network that has multiple risk factors such as the network being a public network, the last mile connectivity being unprotected Wi-Fi, the network not being authenticated properly, etc. Such a network's security profile may be considered weak and the network risk level is high.

(2) Disabling/removing protective security measures: The protective security measures on the machine, such as Authenticated Firewall, Anti-Malware, or IDS/IPS may terminate or be disabled due to worm activity or through legitimate user action.

(3) Weakening the security measures—The protective security measures on the machine may get weakened. For instance, discovery ports, file and print share ports, and other such ports that may be used by an attacker may get opened in the Authenticated Firewall, the virus/spyware signatures on the machine may get deleted or may become out of date, IE security settings may become more lax, IPSEC authentication that was previously ON may get disabled, insecure wireless ad-hoc mode may become enabled (an operating system may be more vulnerable in wireless ad-hoc mode than in wireless Infrastructure mode because of the lack of WEP/WPA security or the presence of weak security measures in ad-hoc mode), etc.

(4) Running non-certified, un-patched or less secure applications—The machine may be running non-certified applications (covering any executable such as exe, dll, ActiveX control, script, etc.) or legacy applications or applications that do not have all security patches. As an example, Windows may be running with an older version of IE. Such applications, considered as being at a lower assurance level than others, raise the risk level of the machine.

(5) System restore or software installation activities—When a system is restored to an earlier time, it may result in reopening vulnerabilities because of lost patches that were installed after the earlier time. Conversely, installing new software may introduce vulnerabilities if the software contains bugs. It may also increase the surface area of attack of the system (opportunities to attack the system).

(6) Running in non User Access Control (UAC) mode—If UAC is off, administrative processes may run at administrative privilege levels instead of at lower privileges by default, thus presenting a larger surface area of attack.

(7) Increased occurrence of undesirable activity—Actions such as repeated incorrect password input attempts, unauthorized attempts to access privileged data, port scanning, etc. may be indicative of malicious activity and a risky environment.

(8) Turning Bitlocker off—If Bitlocker is turned off for a mobile PC, it raises the risk of loss of privacy and data.

(9) Turning on routing between two networks—When routing between two adapters is enabled on a machine that is not an Edge Firewall or a NAT, it may provide an unmonitored and uncontrolled conduit between networks that may be exploited by malware to infiltrate the network and machines on the network.

(10) Putting a network card in promiscuous mode—An attacker may put the network switch into a confused state so that it sends all packets to every port. This may enable the card in promiscuous mode to see traffic of/for every node connected to the switch and may increase the risk level of other machines.

Factors occurring external to the machine that may elevate risk levels are identified as follows:

(11) Publishing of vulnerabilities—When an existing vulnerability in Microsoft Windows® is exposed without a patch being available or applied, the risk level of the vulnerable machines may increase.

(12) Publishing of exploits of vulnerabilities—When an exploit is published, the risk level of unpatched machines goes up even more than when just the vulnerability is published.

(13) Computing devices in the same network or security domain getting infected—When other device(s) on the same network as the device being managed for risk get infected, the other devices may likely infect the device being managed. If the infected device(s) are trusted, the risk level increases substantially.

Referring again to FIG. 1, following the step 106 in which a risk level is determined, processing proceeds to a test step 108 where it is determined whether the risk level calculated at the step 106 exceeds a pre-determined threshold. The threshold may be set to a level corresponding to a value at which it is not acceptable for the operating system and its applications to be operational. The threshold may be established by an administrator or be automatically generated as a default level. As noted elsewhere herein, the threshold may be a numerical value or may be some other identifier. Further, multiple thresholds may be established to indicate different severity levels of risk. For example, a threshold may be established for a danger level that may indicate a risk that warrants quick action to protect the system. Further, a threshold may be established for a critical level that may indicate a risk that warrants immediate and sometimes extreme action to protect the system.

At the test step 108, if the determined risk level does not exceed a particular threshold established as requiring an action, then processing may return to the step 102. However, if the threshold is exceeded, processing proceeds to a step 110 at which an action is caused to be performed.

At the step 110, the action caused to be performed may be based on the risk level and/or the established threshold that the risk level exceeded. The action may be a risk alleviation action that may help alleviate the risk and also potentially prevent the risk from escalating again. In an embodiment, a risk alleviation action may fall into at least one of two categories: a risk mitigation action and/or a risk remediation action. After the step 110, processing is complete.

Risk mitigation action may include actions that may be taken with or without user/administrator consent based on policy. Risk mitigation actions may include: generating a warning or other alert, putting the machine in "high security measure mode", terminating specific high risk applications, terminating communication with non-certified/unknown devices, and putting a machine in self-quarantine mode, as further described elsewhere herein.

In addition to mitigating risks, remediation actions may also be triggered. For example, the risk manager may trigger the NAP agent on the machine to initiate the NAP exchange with the NAP server on the network. This allows the NAP server on the network to assess the risk level of the machine and take appropriate actions to alleviate the risk for the host and the network. The NAP agent may pass the health and the risk level of the system in the Statement of Health packet (SOH) to the NAP server. The NAP server may analyze the SOH to determine if any follow-up action is needed to alleviate the risk. If one is needed, the NAP server may instruct the NAP agent on the machine to take remedial measures and/or quarantine the system, for example.

In another embodiment, in the absence of a NAP infrastructure, the machine may directly undertake risk remediation actions such as downloading of needed updates of software, patches, and signatures. Additional risk mitigation actions may be initiated such as scanning the system to clean known viruses and activating specific IDS/IPS filtering because of newer signatures received due to the update. Additionally, a more extreme form of risk remediation may be for the machine to be returned to a previous known good (low-risk) state of the system and apply extra protective measures on top of that previous state to protect the machine from entering the bad (high-risk) state again. The restoration to a previous known good state may be done to reverse the affects of specific security related events which are suspected of putting the machine at high risk. As an example, if Active Scripting was enabled which put the machine and the networks at elevated risk, and later, the machine was determined to be infected, a risk remediation action may clean the machine and disable Active Scripting. Such action may be taken automatically or may be performed after user confirmation if significant functionality is likely to be impacted. Further, when risk levels fall below specified thresholds, some of the risk alleviation actions that were taken may be reversed if the actions are impacting functionality.

Figure 4:
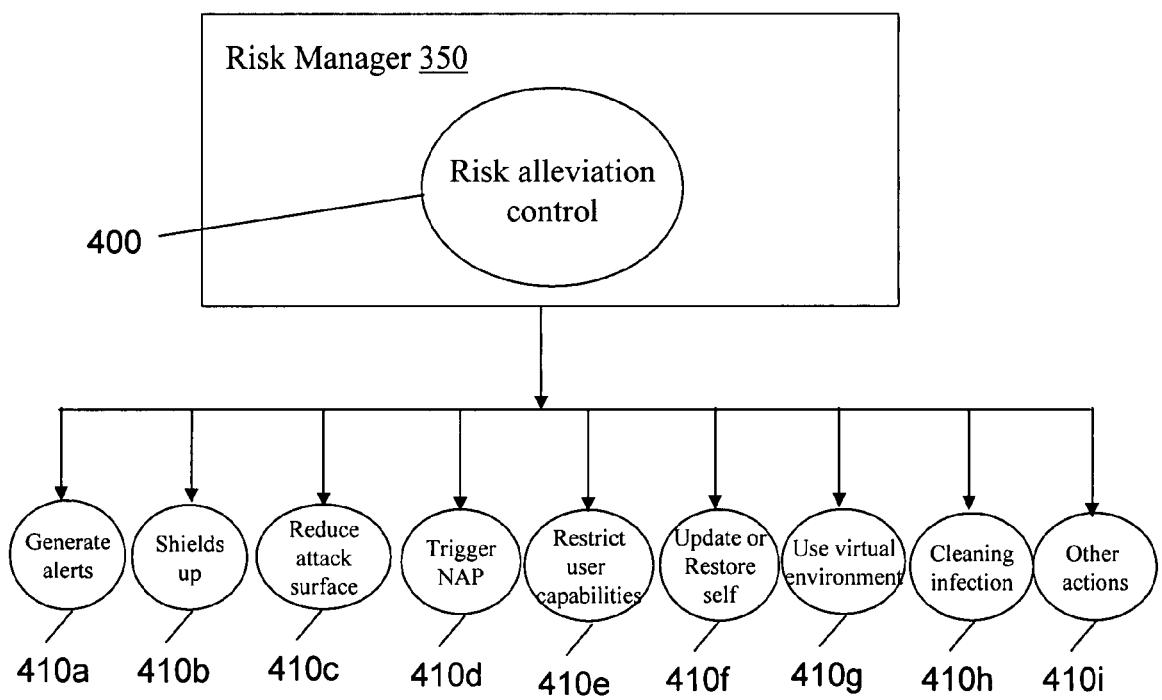
FIG. 4 is a schematic illustration of the controller having a processor to control or initiate various types of risk alleviation actions according to an embodiment of the system described herein.

FIG. 4 is a schematic illustration of controller 350 (that includes the Risk Manager, RM) having a processor 400 to control or initiate various types of risk alleviation actions 410a, 410b, 410c, 410d, 410e, 410f, 410g, 410h, 410i, as further described elsewhere herein. Based on the risk level, the action taken by RM may include one or more of the identified actions and/or other actions. As the risk level increases, the actions taken may be cumulative of all actions taken at lower risk levels. As an example, the RM may start with providing alerts, then go on to triggering enhanced security measure mode, NAP processing, software updates, software restore and then go on to a mode in which nearly all security measures are activated where some functionality gets impacted. The illustrated risk alleviations actions are described as follows.

(1) Generate alerts—Various types of alerts may be generated ranging from visual cues provided on the task bar to sending high-priority alerts to a server to sending the aggregate risk score to a central controller that then takes mitigation and remedial measures for the network, etc. In alerting the user, the machine may inform the user of the new risk level and ask the user to confirm the triggering of specific mitigating actions. This user confirmation may become more important if the mitigating measures can result in loss of functionality until a patch becomes available to remediate the problem.

(2) Trigger High Security Measure Mode—In High Security Measure Mode, the most secure measures may be used to shield the computer from attacks. This includes enabling Authenticated Firewall, IDS/IPS, and/or Anti-Malware, in case any of these are disabled, and employing conservative measures that include one or more of the following actions: (A) Disallowing inbound connections—Only outbound connections may be allowed by default. This means that all existing exceptions to the above rule may be disabled. Such an action may be taken when a machine moves from an Intranet to the Internet. Any exception to this rule may be allowed only after user confirmation or if the risk level of the system goes below a certain threshold. If a machine's risk level is critical because it is suspected or has been determined to be infected by a propagating worm, all inbound and outbound connections may be disallowed.

(B) Accepting only IPSEC or SSL connections—Only IPSEC and SSL connections with an authenticated peer may be allowed. This may be a "clamp down" mode where no unauthenticated machine/user/application is allowed in. This measure may be adopted only in specific situations such as when the machine is in a public, potentially hostile and risky environment.

(C) Setting tighter permissions on code—Tighter permissions on code may be set by appropriate configuration of specific applications. For example, IE Zone may be set to Internet. Managed controls executing in IE may use a default set of sandbox (protected mode) permissions, the Internet Permission Set. This would provide tighter sandboxing to code downloaded from web sites. Other hosting services such as SQL Server and ASP.NET, if installed, may be configured appropriately to run code in low-trust mode. App-domains may be created to run code in isolated mode. Macros may be disabled in Office, etc.

(D) Turning on General Application Protocol Architecture (GAPA) based detection—If the risk is at danger level due to a worm for which there is a GAPA template available, that GAPA template may be turned on.

(3) Reduce attack surface—If the machine is violating its role(s) boundaries, the RM may terminate and disable code that is not required for executing the authorized role(s) of the machine. For the case, where there is no specified role(s) for the machine or the machine is executing within its role(s), the RM may reduce a machine's attack surface by disabling entire components, or specific functionality of components, that are not in use. If specified by policy, even components/functionality that are in use may be terminated and disabled. For example, wireless may be disabled if either it is not being used as in an environment such as an airplane that does not have wireless support or if the machine is multi-homed with both wireless and wire-line connectivity to the same networks. As another example, ports 135, 137, 138, and 139 (Rpcss and Netbios ports—popular attack points) may be shut down. As yet another example, the machine may turn on Data Execution Protection (DEP) protection for all programs or for programs that have a certain risk score by disabling exceptions. Examples of the latter may be shutting down and not allowing execution temporarily of certain applications such as IM that are vulnerable in order to control the spread of a worm known to have an exploit for IM and/or disabling specific functionality such as Active Scripting through "Disabling Active Scripting" security option in IE.

In performing the above actions, the system may begin by terminating/disabling only low assurance components. Low assurance components are those that do not meet a certain preset bar of trustworthiness as indicated by their reputation score. In cases where high-assurance components may increase risk due to known vulnerabilities and exploits and there are machines running such "possibly infected" components, these components may also be terminated/disabled.

The system may also choose to terminate communication with non-certified or unknown devices to reduce the chances of getting infected from untrustworthy sources. This may be complementary to allowing only IPSEC and SSL above which pertains to IP communication. An example would be "pairing" with an unknown Bluetooth device. Such pairing may give the unknown device access to all services on the machine that are available for sharing. When risk levels are high as in a public place, Bluetooth discovery mode may be disabled and/or, more drastically, Bluetooth radio may be disabled.

(4) Trigger NAP—When the risk level reaches danger level while the machine is on the Work network, for example a network with a NAP infrastructure, the RM may trigger the NAP agent on the machine to conduct the NAP protocol with the NAP server on the network so that the machine may be checked for health and if needed quarantined until it gets patched.

(5) Restrict user capabilities—The RM may restrict privileges of high risk individuals regardless of what account they run under. This may be done by changing the risk score of such individuals in the system. Access Control Lists (ACLs) with an associated condition of "principal's risk score <=X" where X is a certain value may not work for individuals whose risk score >X. Also, the RM may ask the security subsystem to strip privileges from the security token of the processes running in the account of the high risk individual.

(6) Precipitate update or restore action—If the machine is on a non-Work network, the machine may use services such as Windows update to update itself immediately with patches, signatures, policy, rules, etc, that are available instead of waiting for its regular scheduled time to do such updates. The machine may resort to a more severe form of risk alleviation by restoring its state to a previously known good state (less risky state) and applying patches and appropriate mitigation measures on top of it to prevent itself from getting back to the previously elevated risk situation that triggered the restore.

(7) Virtualize the environment—The RM may virtualize the execution environment of a user or code to isolate the system from the potential negative affects of that user or code's activity. For example, if the RM determines that a user is engaging in risky behavior, it could run the user's applications in a virtual environment. Thus, the determination of whether to enable UAC or not or to create a virtual machine for a particular user or code may influenced by the risk score of the same (8) Cleaning the infection—In addition to the above actions, risk alleviation actions may include cleaning the machine of any infections. For example, when security measures like AM are enabled, update is done, and NAP is triggered, immediate scanning and cleaning of the machine may also be done. If an update is being done (with or without NAP), the system described herein defer the scanning until after the update is complete in case a new signature file gets downloaded onto the machine. Thus, if a virus were to disable or weaken a security measure on a machine or does an activity that raises the risk level above the machine's safety levels, risk alleviation actions such as the above would not only reactivate the security measures again but would also activate measures that could possibly remove the virus, assuming that its signature is now available because of the update.

TABLE 2 illustrates a few example risky situations and corresponding actions triggered. These actions may be taken with or without user confirmation based on policy. An alert may generated in all cases. In each case, though one possible reason for the risk situation is given, worm activity may also always be a reason.

TABLE 2

| Risk Situation | Risk factor | Possible reason for risk factor | Risk level | Possible actions (automatic or after user confirmation) |
| --- | --- | --- | --- | --- |
| One or more of the security measures - Authenticated FW, IDS/IPS, AV, AS is disabled while machine is on the Internet | Security Measures deactivated | Configuration lapse | High | Reactivate the security measures - enable the disabled component(s). |
| UAC is off while machine is on the Internet | Increased attack surface | Configuration lapse | High | Turn UAC on |
| Critical vulnerabilities discovered on computer for which patches are available | Weakened security measures | Restore to an earlier point opened up vulnerabilities | Critical | Trigger NAP, start update procedure |
| File, Print and Discovery ports open on the Internet | Weakened security measures | Application opens up ports | High | Block ports. Do not open again without user confirmation |
| IE running with zone set to Intranet while on the Internet | Weakened security measures | Configuration lapse | High | Change zone to Internet |
| Dangerous worm on the loose on a network | Risky network | Exploit for known vulnerability published, some machines are known to be infected | High | Enhance security measures (stop all outbound traffic), scan and clean machine, reduce attack surface, Trigger NAP |
| Wireless connection is insecure (no WEP/WPA) | Insecure network | No WEP or WPA. No authenticated access supported by network | Medium | Connect to a secure network that provides connectivity if present in the preferred list and make it more preferred than the insecure network; Filter out non IPSEC and non-SSL traffic |
| Routing is on between interfaces on a non-router machine | Weakened security measures | Configuration lapse | Medium | Disable routing between interfaces, run scan |
| Non-certified applications running on the machine with UAC off | Risky software profile | Toby downloads application despite warning | Medium | Turn UAC on, run low assurance application in a VM |
| Machine's role boundaries are violated | Increased attack surface | Configuration lapse | Medium | Rollback configuration to conform to authorized role(s) |
| Bit-Locker is off (on a laptop) | Weakened security measures | Configuration lapse | Medium | Generate alert, Turn Bit-locker on |

The steps shown and described in connection with the flow diagram 100 of FIG. 1 may be initiated in conjunction with a call to an operating system. For example, any application, driver or other program that calls or modifies the operating system may contain a call to initiate the risk management system described herein at the end of the call. In this way, any change of state of the operating system as a result of an operating system modification may result in a security state assessment by the risk management system.

Figure 5:
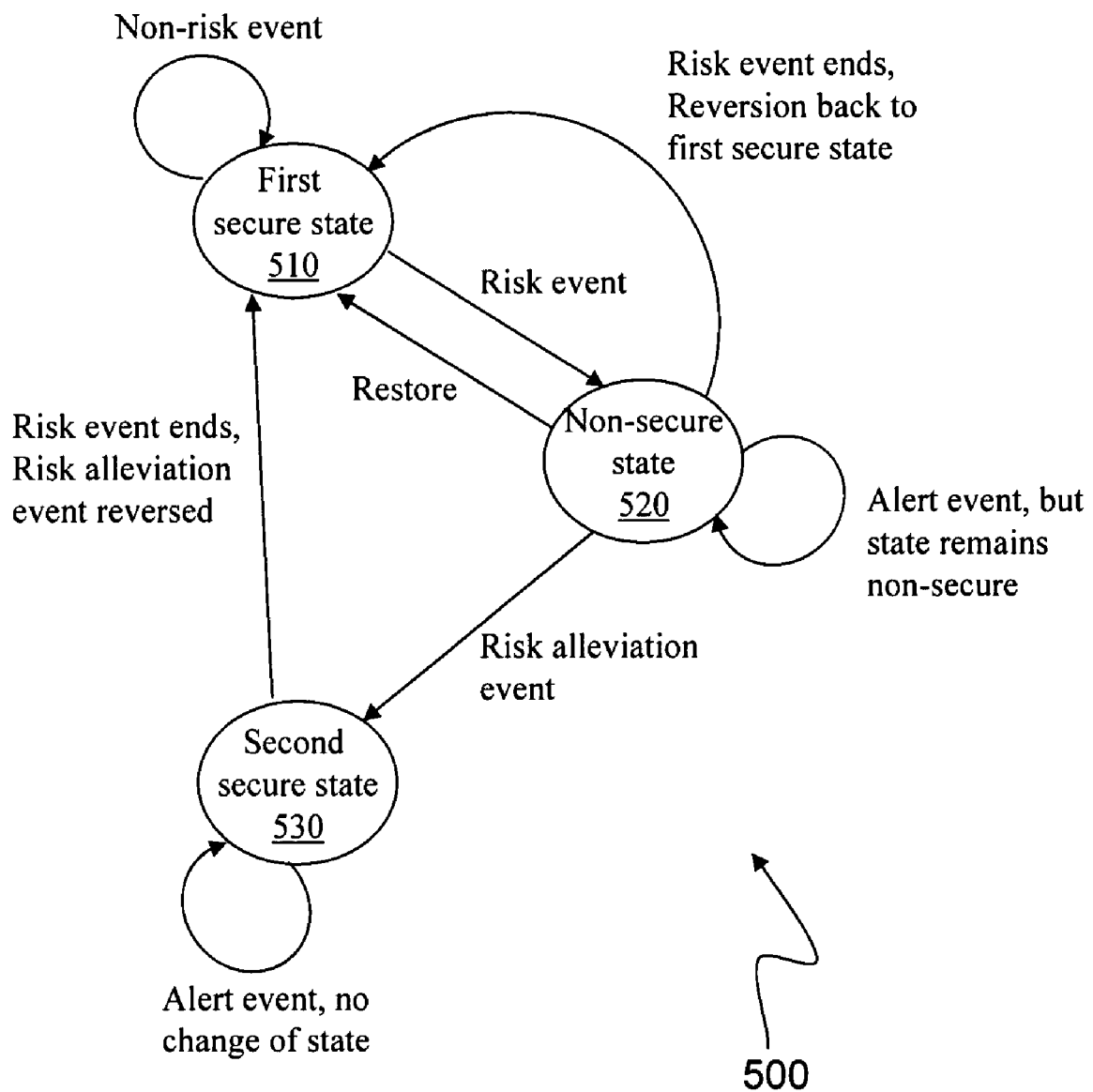
FIG. 5 is a state diagram of an operating system as acted upon by a dynamic risk management system according to an embodiment of the system described herein.

FIG. 5 is a state diagram of an operating system 500 acted upon by a dynamic risk management system according to an embodiment of the system described herein. As shown is a first secure state 510 that is in a "good" secure state. A non-risk event transition is shown that maintains the system in the first secure state 510. A non-risk event may be an event that does not change the state of the operating system. For example, a non-risk event may be an alert to a user that an assessment of the operating system was conducted and no changes were identified. A risk event transition may occur that places the operating system into a non-secure state 520. The non-secure state 520 may be a state having a risk level that exceeds a threshold as the result of the risk event, as further described elsewhere herein.

In response to the assessment of the non-secure state 520, the risk management system according to the system described herein may act to alleviate the risk. One action may be to restore the operating state to the earlier first secure state 510 that was known to be good. Another action may be to transition to non-secure state 520 into a second secure state 530 different from the first secure state 510. Such risk alleviation actions are further described elsewhere herein. An event may also occur in the non-secure state 520 that alerts a user to the problem but that does not modify the non-secure state 520. It is also possible that the risk event may pass and the operating system reverts back to the first secure state 510.

In the second secure state 530, an alert event may occur that alerts a user to the modification to the second secure state but which does not change the second secure state. It is also possible that the risk event that initially occurred ends and the risk alleviation event that placed the system into the second secure state 530 is reversed, resulting in a return of the system to the first secure state 510.

Figure 6:
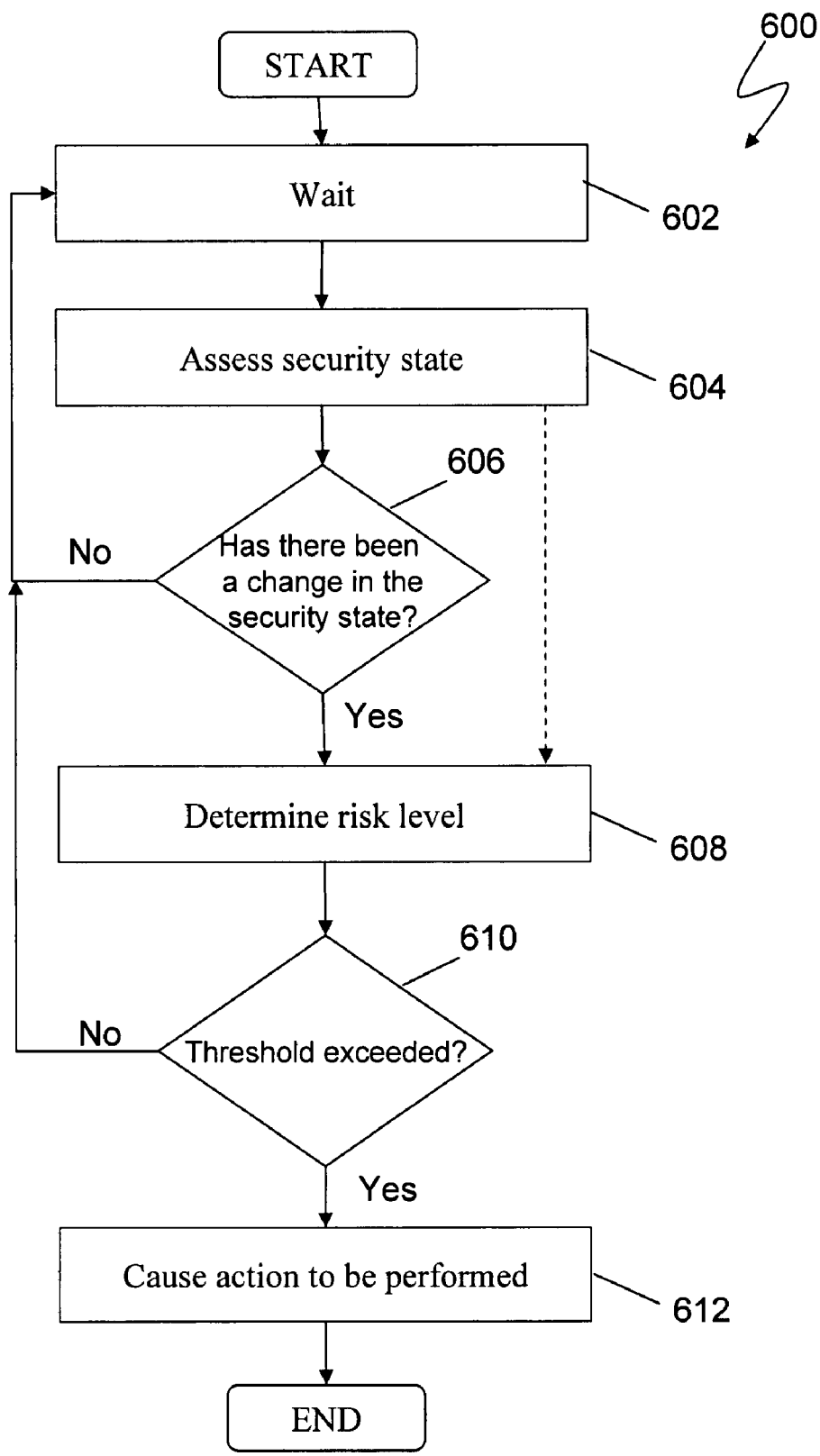
FIG. 6 is a flow diagram of dynamic risk management according to another embodiment of the system described herein.

FIG. 6 is a flow diagram 600 of dynamic risk management according to another embodiment of the system described herein. In the illustrated embodiment, the system is shown as operating in an automatic, asynchronous manner that may be independent of changes in the security state and/or actions of a user. At a step 602, the system waits a predetermined time interval before processing proceeds automatically to a step 604. The predetermined time interval may be any suitable time period for safeguarding system security. That is, the time interval may be based on an evaluation of an acceptable time period that provides a suitable level of security according to a particular security requirement and that is in balance with the required CPU processing time. For example, in an embodiment, the time interval is as small as practicable in order to be substantially continuous; however, it should be noted that such an embodiment may use an undesirably large amount of CPU processing time and memory. In various embodiments, suitable time periods may be larger if changes in the security state are infrequent. In an embodiment, the interval may be at least two to three times the amount of time it takes to assess the state of the system.

Processing after the 604 may proceed in a similar manner as described elsewhere herein. After the step 604, processing may proceed to a test step 606 at which it is determined whether a change in the security state of the system has occurred. If a change in the security state has not occurred, processing may proceed back to the step 602. If a change in the security state has occurred, processing may proceed to a step 608 at which a risk level is determined. Alternatively, processing may proceed automatically from the step 604 to the step 608 without intervening test step 606.

After the step 608, processing proceeds to a test step 610 at which the risk level is compared with a predetermined threshold. If the risk level does not exceed the threshold, processing may proceed back to the step 602. If the risk level does exceed the threshold, then processing proceeds to the step 612 at which one or more actions are caused to be performed to alleviate the risk, as further described elsewhere herein. After the step 612, processing is complete.

It should be noted that the system described herein may be operated in any combination of the embodiments disclosed herein. For example, the system may operate only when called following a new installation into the operating system indicating a change of state and/or may operate only in an asynchronous mode in which security assessments are performed on the occurrence of an event affecting the system or periodically and/or may operate in both modes.

Figure 7A:
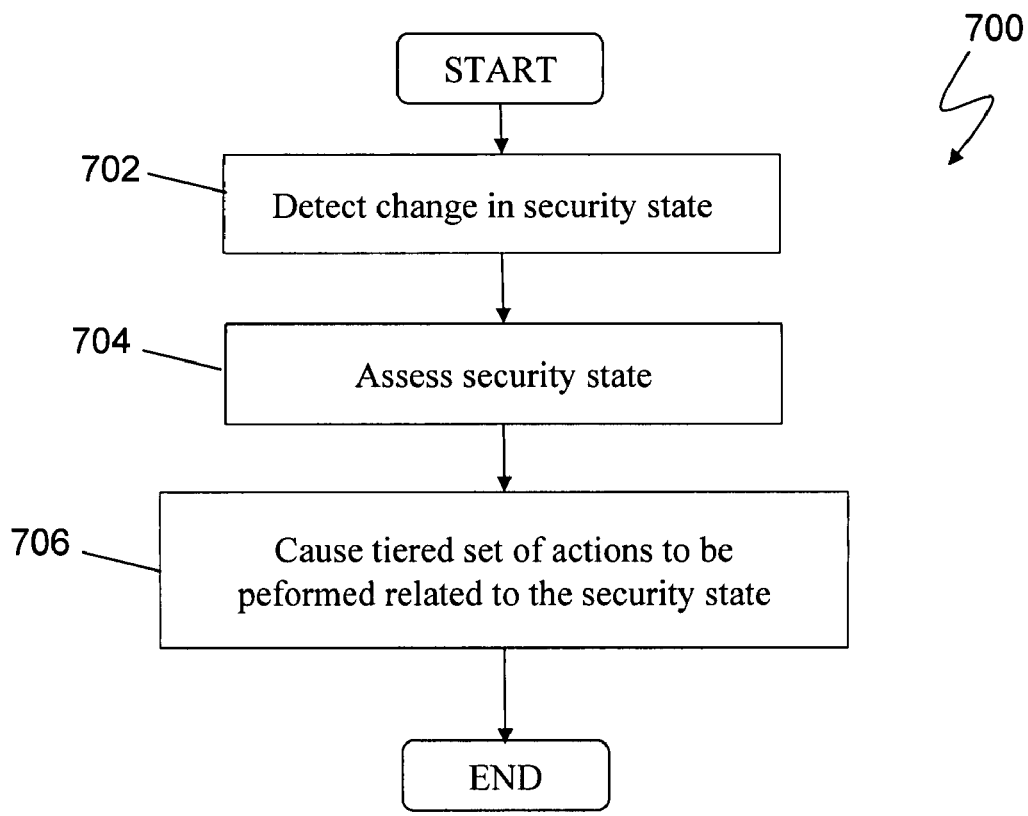
FIG. 7A is a flow diagram of dynamic risk management according to another embodiment of the system described herein.

FIG. 7A is a flow diagram 700 of dynamic risk management according to another embodiment of the system described herein. At a step 702, a change in the security state is detected. After the step 702, processing proceeds to a step 704 at which the security state is assessed. After the step 704, processing proceeds to a step 706 where a tiered set of actions are caused to be performed. The tiered set of actions may be performed automatically following the assessment of the security state.

Figure 7B:
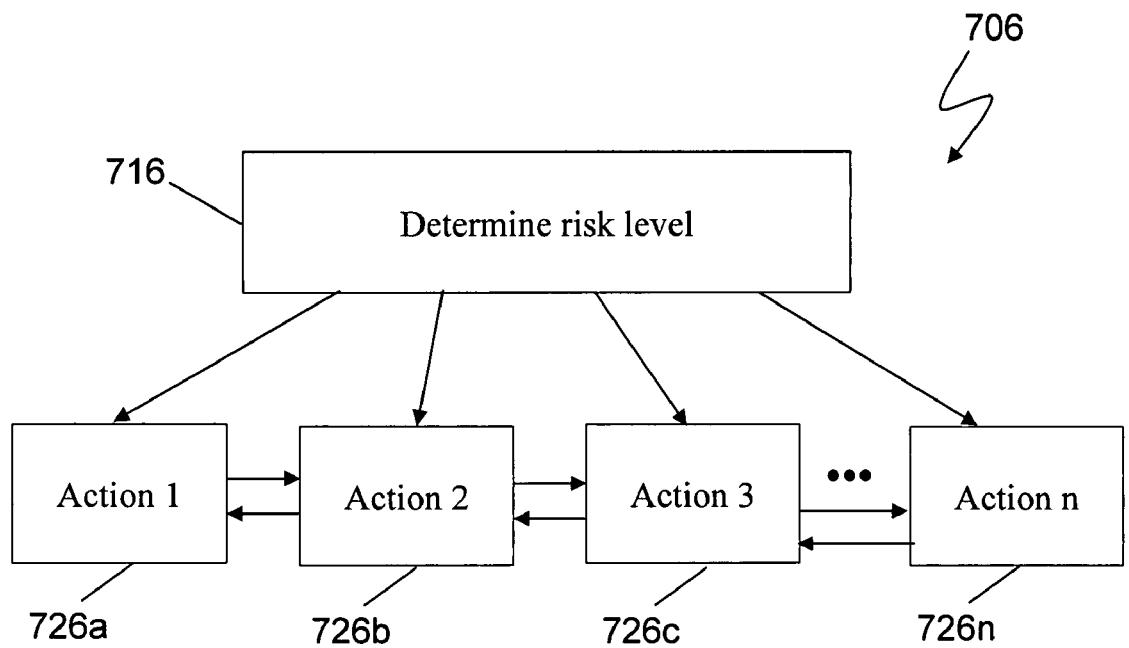
FIG. 7B is a schematic illustration of the tiered set of actions shown in FIG. 7A.

FIG. 7B is a schematic illustration of the tiered set of actions shown by the step 706 in FIG. 7A. As shown, an initial action may be a determination of risk level 716, as further described elsewhere herein. Based on the determination of risk level, one or more of actions 726a-n may be performed to alleviate the risk and based on the determined risk level. In various embodiments, actions 726a-n may be performed sequentially or in parallel.

Figure 8A:
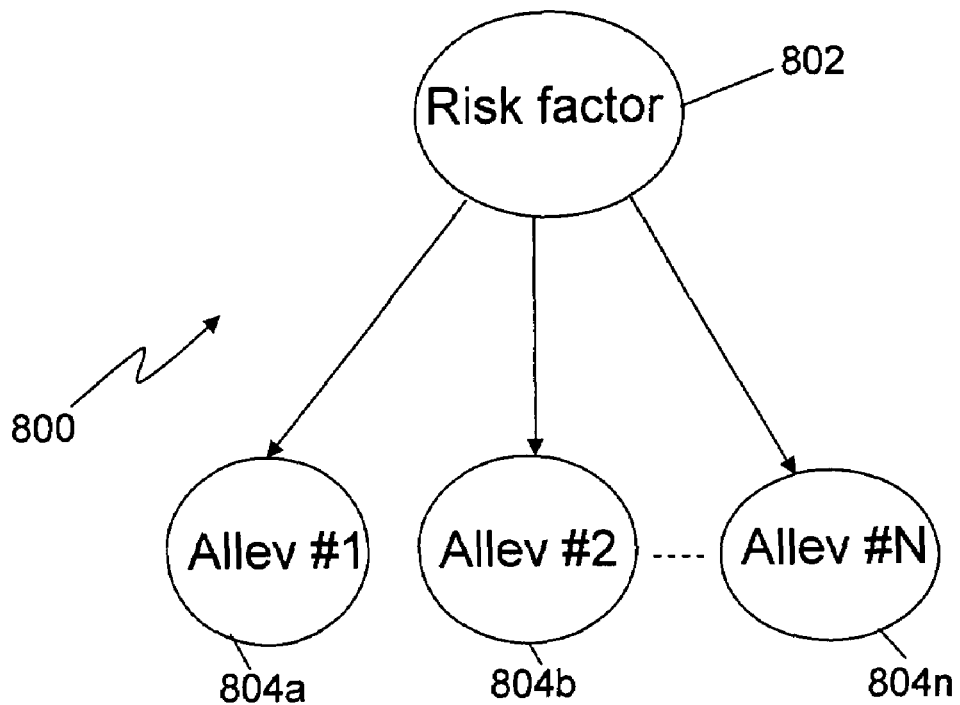
FIGS. 8A and 8B are schematic illustrations showing a system according an embodiment of the system described herein that allows multiple risk alleviation actions to address one risk factor and allows multiple risk factors to be alleviated with one risk alleviation action.
Figure 8B:
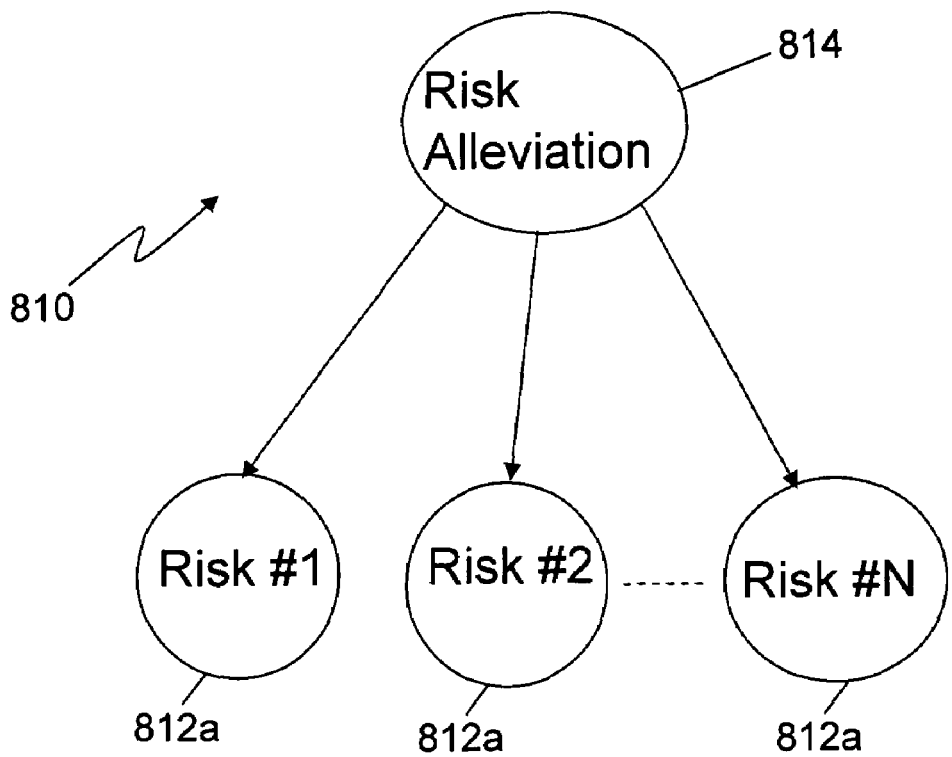

FIGS. 8A and 8B are schematic illustrations showing a system according an embodiment of the system described herein that allows multiple risk alleviation actions to address one risk factor and allows multiple risk factors to be alleviated with one risk alleviation action. FIG. 8A is a diagram 800 showing that risk alleviation of a risk factor 802 may occur with multiple risk alleviation actions 804a, 804b . . . 804n. For example, that risk factor 802 may be that File and Print share parts are open, and the risk alleviation actions 804a-n may include placing system behind a perimeter firewall, placing the system on a Work network type, turning User Access Control (UAC) ON and/or allowing only IP security (IPSEC) traffic.

FIG. 8B is a diagram 810 showing that one risk alleviation action 814 may mitigate risks from multiple risk factors 812a, 812b . . . 812n. For example, the risk factors 812a-n may include the system is on the Internet, there is an application vulnerability for which an exploit has been published and UAC is OFF. The risk alleviation action 814 that mitigates or otherwise addresses the risk factors 812a-n may be to turn a firewall ON.

The system described herein may automatically and quickly employ different types of protection based on the system's risk level through the use of risk conditioned authorizations. Risk conditioned authorization, specified through conditional ACLs (Access Control Lists), allow principals to access the system resources only at certain risk levels. Thus, if the authorizations specified by such ACLs work only when the risk to the system is below a certain threshold then a system having more security measures may be employed when the risk to the system crosses the threshold. As an example, if a remote user write access to a file through a conditional ACL when the machine has a risk level of low to medium, then if the risk level goes up to high, the write authorization specified in the ACL gets automatically revoked without any explicit action from the RM. The remote user may be denied access in this situation.

The following example flow shows how through ACLs conditioned on risk, a system can be self-adjusting/protecting. Machine policy may be that no web site be accessed when the machine's risk rating is greater than or equal to 8 (in a risk range of 1-10 where 10 is the highest). This may translate into the following rule:
Rule: Object=(ObjectId=*, ObjectType=TCP) {Action=Connect, Principal=AnySid, Permission=Allow, Condition=MachineRiskScore:(1..7)}.
●.

Figure 9A:
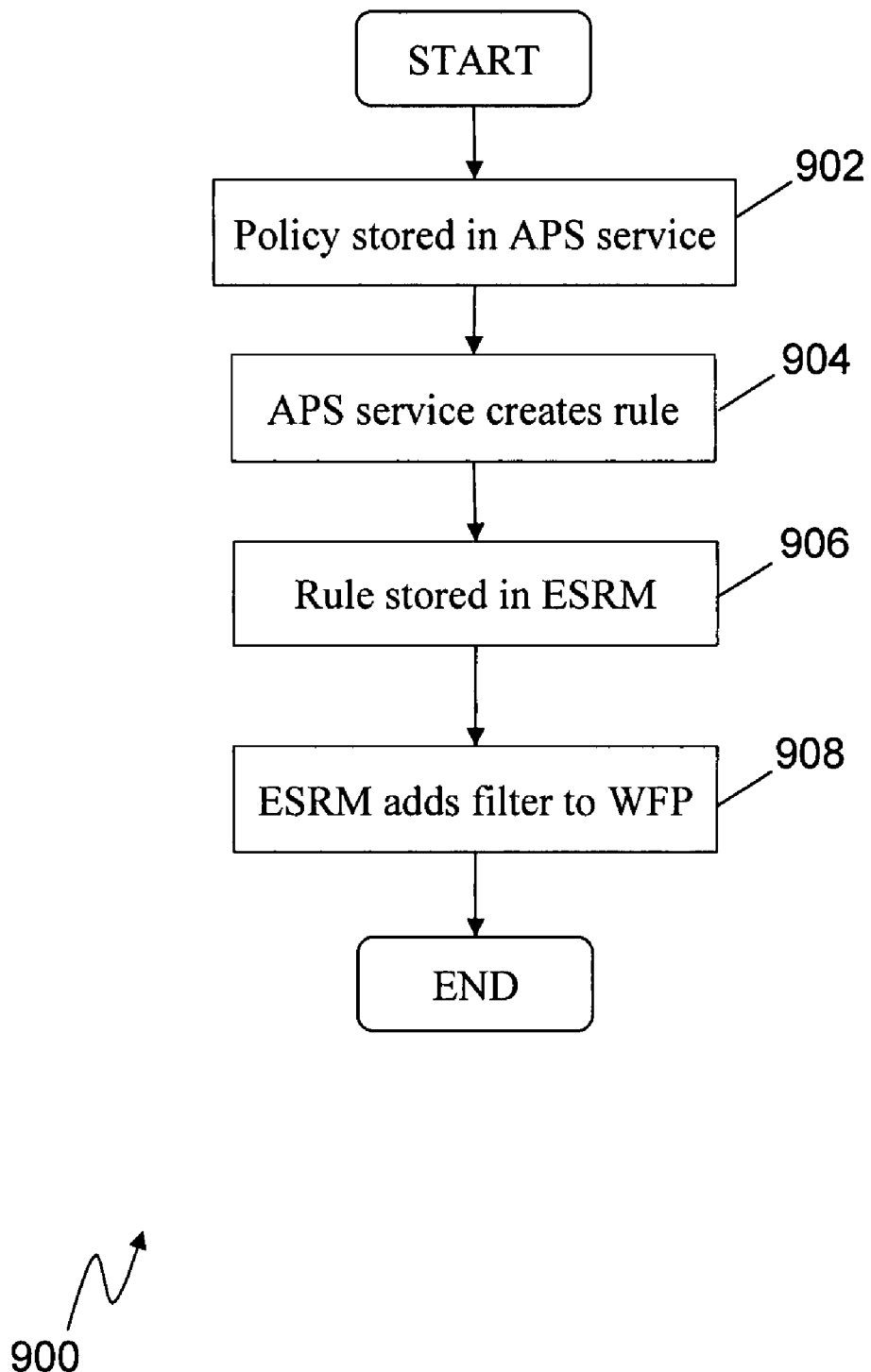
FIG. 9A is a flow diagram showing establishing a rule from policy on an operating system according to an embodiment of the system described herein.

FIG. 9A is a flow diagram 900 showing establishing of a rule from policy on an operating system according to an embodiment of the system described herein. At a step 902, a policy is stored in an Active Protective System (APS) service. After the step 902, processing proceeds to a step 904 at which the APS service creates one or a series of rules based on the policy. After a step 904, processing proceeds to a step 906 at which the rule or rules are stored in the Extended Security Reference Monitor (ESRM), an OS component that enforces security rules in the system. After the step 906, processing proceeds to a step 908 at which the ESRM adds filters based upon the rule(s) into Windows File Protection (WFP). After the step 908, processing is complete.

Figure 9B:
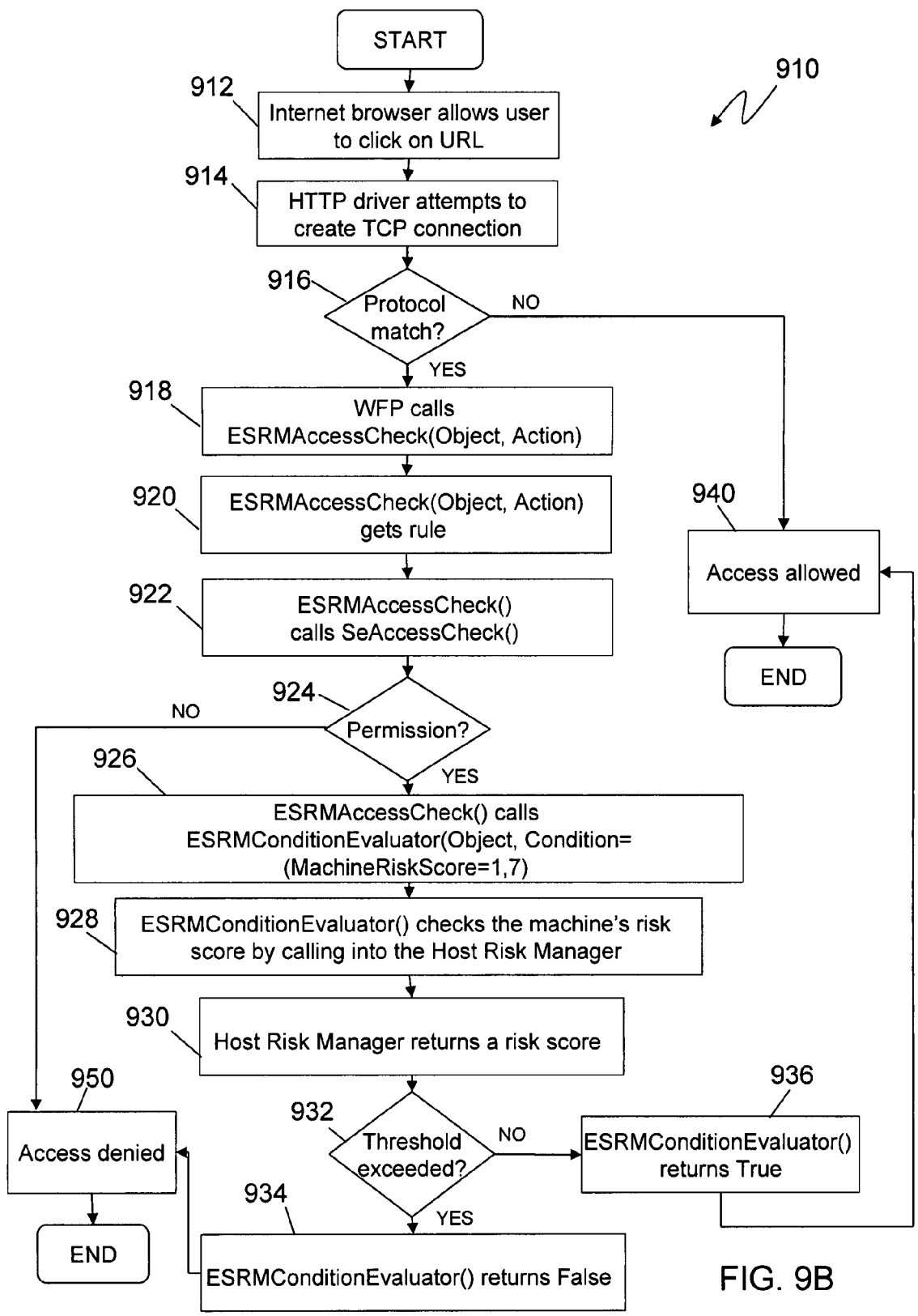
FIG. 9B is a flow diagram showing the response of the system to a user action after the above-noted rule has been added to the system according to an embodiment of the system described herein.

FIG. 9B is a flow diagram 910 showing the response of the system to a user action after the above-noted rule has been added to the system according to an embodiment of the system described herein. At a step 912, an Internet browser allows the user click on an URL. After step 912, processing proceeds to a step 914 at which an HTTP driver attempts to create a TCP connection. After the step 914, processing proceeds to a test step 916 where it is determined if there is a protocol match with a TCP filter that ESRM had added for the above rule into WFP. If there is no protocol match, then processing may proceed to a step 940 at which access to the URL is allowed or, alternatively, another security assessment procedure may be initiated. If there is a protocol match, then at a step 918, WFP calls ESRMAccessCheck(Object, Action) where Object=(ObjectId=*, ObjectType=TCP) and Action=Connect. After the step 918, processing proceeds to a step 920, at which ESRMAccessCheck gets the rule for TCP from its repository through ESRMGetRule(Object). After the step 920 processing proceeds to a step 922, ESRMAccessCheck( ) strips off the condition clause and calls SeAccessCheck( ). After the step 922, processing proceeds to a test step 924 at which SeAccessCheck( ) checks permission in the rule for the user. If at the test step 924, the user does not have permission then processing proceeds to a step 950 where Access is Denied and the user's Internet browser fails to get to the URL.

If, at the step 924, permission is allowed then processing proceeds to a step 926 at which SeAccessCheck( ) returns AccessAllowed and ESRMAccessCheck( ) calls ESRMConditionEvaluator(Object, Condition=(MachineRiskScore=1, 7). After the step 926, processing proceeds to a step 928 at which ESRMConditionEvaluator( ) checks the machine's risk score by calling into the Host Risk Manager. After the step 928, processing proceeds to a step 930 at which the Host Risk Manager returns a risk score. At a test step 932, the risk score is compared to a threshold for the rule. If the threshold for the rule is exceeded (for example, a risk score of nine is returned with respect to the above-noted rule), then processing proceeds to a step 934 at which ESRMConditionEvaluator( ) returns False. If there are no other access control rules after the step 934, processing proceeds to the step 950 at which ESRMAccessCheck( ) returns AccessDenied and the packet is dropped and the user's Internet browser fails in getting to the URL. If the threshold for the rule is not exceeded, then processing proceeds to a step 936 at which ESRMConditionEvaluator returns True. After the step 936, processing may proceed to the step 940 at which access to the URL is allowed or, alternatively, another security assessment procedure may be initiated.

In the above, ESRMAccessCheck( ), ESRMGetRule( ), SeAccessCheck( ), and ESRMConditionEvaluator( ) are all functions provided either by the Dynamic Risk Manager component in the Operating System or by other parts of the security subsystem within the Operating System. All of the steps described herein may be implemented as executable code in a processor or other computer-readable medium.

Figure 10:
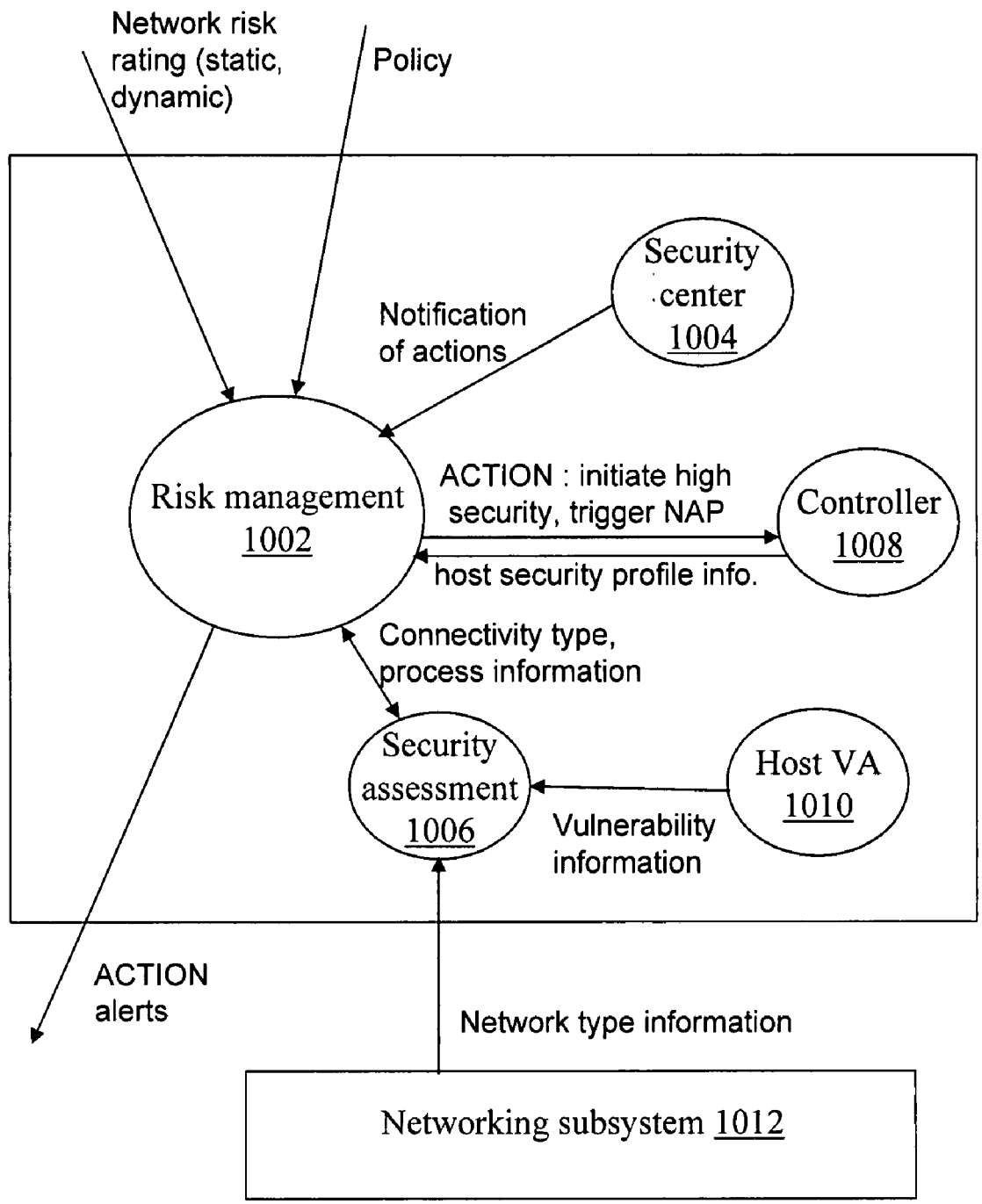
FIG. 10 is a schematic illustration of high level software architecture 800 showing operation of a risk management subsystem according to the system described herein

FIG. 10 is a schematic illustration of a high level architecture of a risk management subsystem 1000 according to the system described herein. A risk management component 1002 may receive external policy information and network risk ratings (static, dynamic). A security center component 1004 may handle presentation of the risk level to the user and allow the user to specify and take risk mitigating/remedial actions. In an embodiment, the security center component 1004 may be the Windows Security Console for local UI and/or a MMC UI for remove management. The risk management component 1002 may receive notification of actions taken from the security center component 1004.

The risk management component 1002 may also receive connectivity type information and process information from a Security State Assessment component 1006 that assess the state of the system. The security state assessment component 1006 may receive vulnerability information from a Host vulnerability assessment (HVA) component 1010 that scans for vulnerabilities as further discussed elsewhere herein. The security state assessment component 1006 may also receive network type information from a networking subsystem 1012, such as a Network RM as further discussed elsewhere herein.

The risk management component 1002 may receive host security profile information and changes made to it from a controller 1008. The controller 1008 may also provide information on the list of non-certified applications running on the system. Using the received information, as further described elsewhere herein, the risk management component 1002 may cause actions to be performed, such as sending alerts externally or sending instructions to the controller 1008 to perform actions, such as enabling security measures, or trigger NAP. The risk management subsystem 1000 may interface with windows components in user and kernel model through Windows Management Instrumentation (WMI).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of dynamic risk management for an operating system of a computing device, the method comprising:
 automatically assessing a security state of the operating system of the computing device independent of security state changes;
 determining, based on the assessing, a risk level $R_{New}$, wherein $R_{New} = R_{Current} + \Sigma rf_{New} - \Sigma rf_{Old} + ri_{New} - ri_{Old}$ where $R_{Current}$ is a current risk level, and where $\Sigma rf_{New}$ is a sum of scores assigned to new risk factors discovered by the assessing, and where $\Sigma rf_{Old}$ is a sum of scores assigned to old risk factors of $R_{current}$ that are no longer discovered by the assessing, and where $ri_{New}$ is a new risk increment based on a combination of the new risk factors, and where $ri_{Old}$ is an old risk increment based on a combination of the old risk factors;
 causing an action related to the operating system of the computing device to be performed based on the risk level.

2. The method according to claim 1, further comprising detecting a change in the state of the operating system.

3. The method according to claim 1, wherein the action is caused to be performed in response to the risk level exceeding a predetermined threshold.

4. The method according to claim 1, wherein automatically assessing the security state includes monitoring a risk factor of the operating system.

5. The method according to claim 1, wherein automatically assessing the security state includes pushing a data inquiry to at least one component or includes pulling data from the at least one component.

6. The method according to claim 1, wherein the security state is automatically assessed periodically over a predefined time interval.

7. The method according to claim 1, wherein the operating system is coupled to a network.

8. The method according to claim 1, wherein the action caused to be performed includes an action of a type that is risk mitigation or that is risk remediation.

9. The method according to claim 1, wherein the action includes at least one of:
 generating an alert;
 activating a security measure;
 restoring to an earlier state of the operating system;
 terminating a network connection;
 disabling a component;
 disabling operation of at least a portion of software code;
 initiating a software protection program.

10. The method according to claim 1, wherein the risk level is determined based on at least one risk factor identified in relation to the security state.

11. The method according to claim 10, wherein the risk level is determined based on a combination of at least two risk factors identified in relation to the security state.

12. A system having at least one processor that is configured to perform the method recited in claim 1.

13. A method of dynamic risk management for an operating system of a computing device, the method comprising:
 assessing a security state of the operating system of the computing device;
 automatically causing, in response to the assessing, a tiered set of actions related to the security state of the operating system of the computing device to be performed, wherein the tiered set of actions includes:
  (i) determining a risk level $R_{New}$, wherein $R_{New} = R_{Current} + \Sigma rf_{New} - \Sigma rf_{Old} + ri_{New} - ri_{Old}$ where $R_{Current}$ is a current risk level, and where $\Sigma rf_{New}$ is a sum of scores assigned to new risk factors discovered by the assessing, and where $\Sigma rf_{Old}$ is a sum of scores assigned to old risk factors of $R_{Current}$ that are no longer discovered by the assessing, and where $ri_{New}$ is a new risk increment based on a combination of the new risk factors, and where $ri_{Old}$ is an old risk increment based on a combination of the old risk factors, and
  (ii) causing a risk alleviation action related to the operating system of the computing device to be performed based on the risk level.

14. The method according to claim 13, wherein the security state of the operating system is assessed synchronously with a change of state of the operating system.

15. The method according to claim 13, wherein the security state of the operating system is assessed asynchronously with a change of state of the operating system.

16. The method according to claim 13, wherein the risk level is determined based on a combination of at least two risk factors.

17. The method according to claim 13, wherein the risk alleviation action includes a risk mitigation action or includes a risk remediation action.

18. A system having at least one processor that is configured to perform the method recited in claim 13.

* * * * *